United States Patent [19]
Ganser

[11] Patent Number: 5,947,517
[45] Date of Patent: *Sep. 7, 1999

[54] STEERING COLUMN FOR A MOTOR VEHICLE

[75] Inventor: Martin Ganser, Weil der Stadt, Germany

[73] Assignee: MC Micro Compact Car AG, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/904,771

[22] Filed: Aug. 1, 1997

[30] Foreign Application Priority Data

Aug. 2, 1996 [DE] Germany ............... 196 31 214

[51] Int. Cl.⁶ ................................... B62D 1/19
[52] U.S. Cl. ............................. 280/777; 74/492
[58] Field of Search .................. 280/775, 777, 280/779; 74/493, 492

[56] References Cited

FOREIGN PATENT DOCUMENTS 23 16 515 C2  11/1983  Germany .
1-175965  12/1989  Japan .

*Primary Examiner*—Paul N. Dickson
*Attorney, Agent, or Firm*—Evenson, McKeown, Edwards & Lenahan, P.L.L.C.

[57] ABSTRACT

A steering column for a motor vehicle has a steering spindle section which can be deformed in an energy-converting manner during a crash. On a side acted upon by the impact, the steering spindle is displaceably disposed in an axial slide bearing and is held at the opposite end in an axial fixed bearing. At least one additional slide bearing radially supports the steering spindle on the motor vehicle close to the deformable steering spindle section, on the side acted upon by the impact.

12 Claims, 1 Drawing Sheet

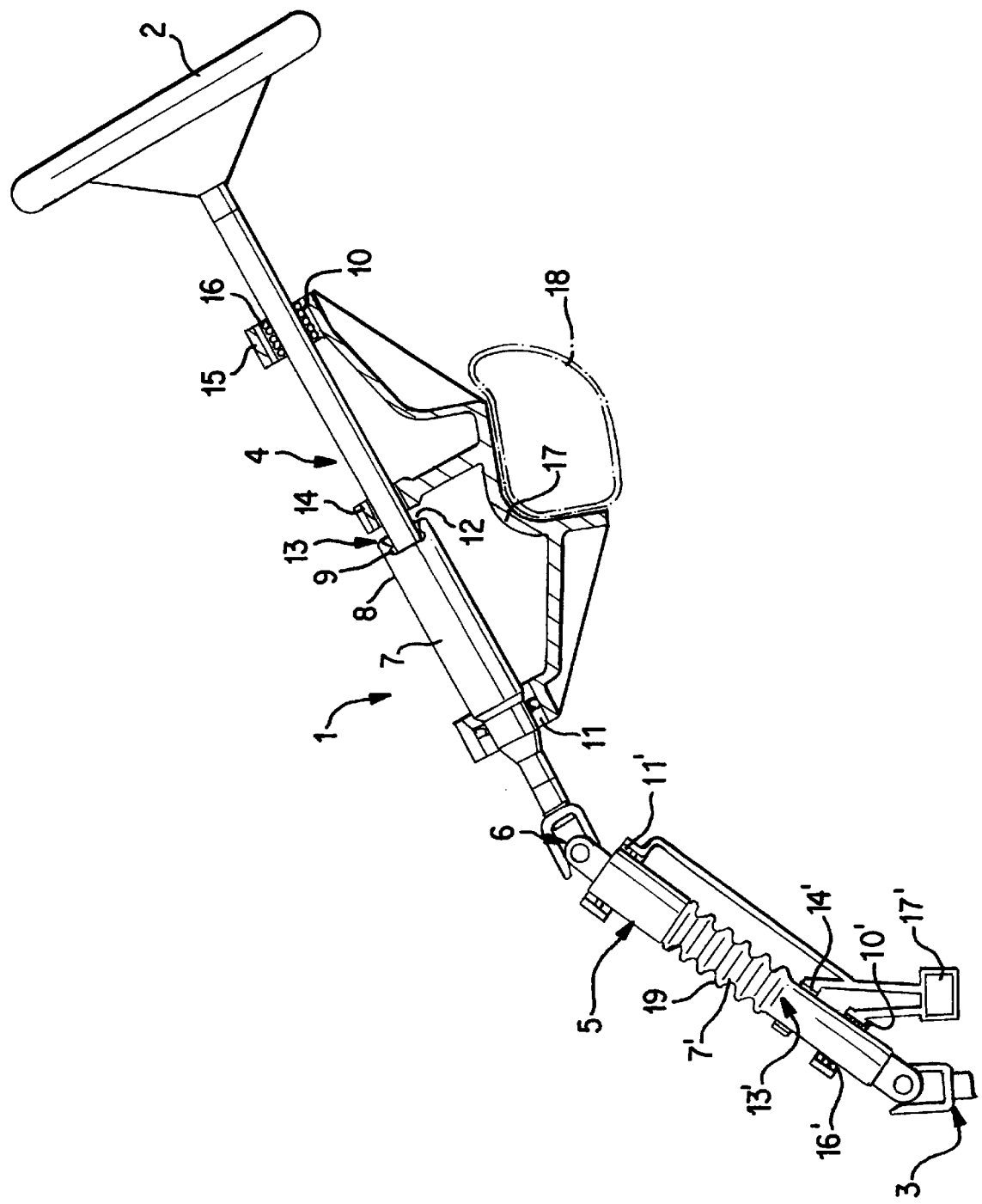

STEERING COLUMN FOR A MOTOR VEHICLE

BACKGROUND AND SUMMARY OF THE INVENTION

This application claims the priority of 196 31 214.0, the disclosure of which is expressly incorporated by reference herein.

The present invention relates to a steering column for a motor vehicle, and more particularly, to a steering column having a steering spindle section which is deformable in an energy-converting manner in a crash, on a side acted upon by the impact, the steering spindle being displaceably disposed in an axial slide bearing and being held at the opposite end in an axial fixed bearing.

DE 23 16 515 A1 describes a flexible steering spindle having a targetedly shaped steering spindle section which can be deformed in a crash. On the side of a steering wheel, the steering spindle is clamped in a deformable bearing and, on the other side of the deformable steering spindle section, is held in another deformable axial fixed bearing. In the event of a strong axial loading of the steering wheel, a buckling of the steering spindle is achieved in this corrugated-tube-type steering spindle section. The steering spindle will then place itself with less resistance against the impact of an occupant onto the steering wheel. The impact energy reduced thereby is, however, low because the steering spindle section evades its deformation for the most part. An energy reduction along a longer displacement path of the steering spindle cannot be achieved in this known construction.

It is an object of the present invention to achieve a uniformly lasting impact energy reduction during a crash with a steering column.

This object has been achieved in accordance with the present invention by providing the deformable steering spindle section, on the side acted upon by the impact, at least one additional slide bearing radially supports the steering spindle in the motor vehicle.

The steering spindle is supported with the targetedly shaped steering spindle section which can be deformed in an energy-converting manner in a crash by two bearing points supporting the steering spindle and by a slide bearing, which also supports the deformable steering spindle section and guides it during the deformation. Thereby, a buckling of the steering spindle is prevented in the event of a high axial loading, in which the friction proportion in the slide bearing is only low with respect to the deformation work which is achieved in the deformable steering spindle section. Thereby, a uniform energy reduction is ensured along a long deformation path.

A slide bearing which can be manufactured in a simple manner and at reasonable cost minimizes the loading of an occupant in the event of an impact onto the steering wheel with optimal functioning of the deformable steering spindle section.

Furthermore, the energy reduction can be improved by a targetedly deformable steering spindle section in the lower steering spindle part by an advantageous bearing described above. Thereby, a steering wheel displacement in the direction toward the occupant by the intrusion of the forward structure can be prevented in a crash. A high-expenditure alteration of the steering spindle itself is not required for this purpose. In an assembly-friendly manner, the slide bearings and the fixed bearing can be combined in one piece in a fastening flange and can be jointly mounted in the motor vehicle.

With axial loading during a vehicle crash, a slip tube, as the deformable steering spindle section, can reduce energy because of its typical deformation capability. That is, one of the ends of the slip tube, at the slip-in end, is pressed through the slip-tube cavity, and the slip tube wall experiences a continuous deformation. The steering spindle is now additionally supported in the slide bearing close to the slip-in end of the slip tube so that the deformation of the slip tube can take place in a uniform and long-lasting manner. In order to avoid an initially increased resistance at the start of the deformation, the slip tube may have a bendable predeformation in the slip-in direction at the slip-in end.

By improving the guiding characteristics with the use of additional slide bearing, a simply constructed, deformable steering spindle section is achievable on the steering spindle, which can therefore also be molded in one piece into the steering spindle.

So that, the longitudinally displaceable section of the steering spindle obtains a well- sliding guide during its displacement, a ball cage can be provided in one or in several slide bearings and can be displaced with the steering spindle.

BRIEF DESCRIPTION OF THE DRAWING

Other objects, advantages and novel features of the present invention will become apparent from the following detailed description of the invention when considered in conjunction with the sole FIGURE which is an elevational side view of a steering spindle in accordance with the present invention.

DETAILED DESCRIPTION OF THE DRAWINGS

A motor vehicle steering spindle 1 designated generally by numeral 1 connects a steering wheel 2 in a torque-transmitting manner with a known type of steering gear. The steering spindle 1 is divided into two spindle sections 4, 5 which are connected by a universal joint 6.

In the upper spindle section 4, a deformable steering spindle 7 is integrated which in this embodiment is formed by a slip tube 8 which, in the event of a crash and a high axial pressure onto steering wheel 2, is inverted toward the inside with an end-side predeformation 9, whereby impact energy is converted to deformation energy. In the deformation process, the steering spindle section 7 is supported on top by a slide bearing 10 in a radial manner and is supported at the lower end by a fixed bearing 11 in both a radial and axial manner.

In order to obtain, in an undisturbed manner, a uniform energy reduction along a long deformation path, close to the slip-in end 12 of the slip tube 8, at least one additional slide bearing 14 is provided on the side 13 acted upon by the shock, to support the steering spindle 1 radially in the motor vehicle and therefore also to prevent a buckling. The friction proportion in the slide bearing 14 is so low that the slip tube 8 can undergo or perform its deformation work in a largely unhindered manner and can carry out a high energy reduction in favor of the impacting vehicle occupant. An axially displaceable ball cage 16 is inserted into the end-side slide bearing 10 in a guide sleeve 15 and is fixed on the spindle section 4. Thereby, an axial displacement of the spindle section 4 is permitted also without any high friction resistance.

An easily workable and low-cost fixing of the slide bearings 10, 14 and of the fixed bearing 11 is achieved by fixing these components in one piece with a common fastening flange 17 in the motor vehicle on, for example, a cross member 18.

A comparably operating steering spindle section 7' is part of the lower spindle section 5 of the steering spindle 1. The steering spindle section 7' is formed by a corrugated tube 19 which, in the event of a forward-structure intrusion of the motor vehicle with an axial loading of the steering spindle 1, can be flexibly pushed together from below. This spindle section 5 is supported in the direction of the steering gear 3, in a slide bearing 10' with an internal ball cage 16' and close to the universal joint 6 in a fixed bearing 11'. In order to achieve, also by way of the corrugated tube 19, an energy reduction which is as uniform as possible in the case of a long-lasting deformation, another slide bearing is provided 14' starting on its side 13' acted upon by the impact, so that the spindle section 5 is additionally radially supported close to the corrugated tube 19. The slide bearing 14' can completely surround the corrugated tube 19 and serve as a guide therefor. This permits a high energy reduction and prevents an axial displacement of the steering column 1 with the steering wheel 2 in the direction of the vehicle occupant.

In order to permit a fixing which is easy to handle at reasonable cost, the slide bearings 10', 14' and the fixed bearing 11' are also fixed in one piece with a common fastening flange 17' in the motor vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering column for a motor vehicle, comprising a steering spindle adapted to have a steering device arranged at a first end thereof, a steering spindle section configured to be deformable in a crash and having a first spindle section end adjoining a second end of the steering spindle, a first axial slide bearing arranged on the steering spindle nearer the first end thereof, a second axial slide bearing arranged on the steering spindle nearer the second end thereof, and an axially fixed bearing arranged in an area of a second end of the deformable steering spindle section.

2. The steering column according to claim 1, wherein the slide bearings and the axially fixed bearing constitute a unitary piece with a fastening flange.

3. The steering column according to claim 1, wherein the steering spindle is divided by a universal joint into spindle sections, and the deformable steering spindle section is a targetedly deformable section provided in each of the spindle sections.

4. The steering column according to claim 1, wherein the second axial slide bearing is a central slide bearing configured to support the steering spindle in proximity to a slip-in end of a slip-in tube of the deformable spindle section.

5. The steering column according to claim 4, wherein, on the slip-in end, the slip-in tube has a bendable predeformation zone in a slip-in direction.

6. The steering column according to claim 5, wherein the slide bearings and the axially fixed bearing constitute a unitary piece with a fastening flange.

7. The steering column according to claim 6, wherein the steering spindle is divided by a universal joint into spindle sections, and the deformable steering spindle section is a targetedly deformable section provided in each of the spindle sections.

8. The steering column according to claim 1, wherein a ball cage is operatively arranged in at least one of the slide bearings to permit an axial displacement movement of the steering spindle.

9. The steering column according to claim 8, wherein the slide bearings and the axially fixed bearing constitute a unitary piece with a fastening flange.

10. The steering column according to claim 9, wherein the steering spindle is divided by a universal joint into spindle sections, and the deformable steering spindle section is a targetedly deformable section provided in each of the spindle sections.

11. The steering column according to claim 10, wherein the second axial slide bearing is a central slide bearing configured to support the steering spindle in proximity to a slip-in end of a slip-in tube of the deformable spindle section.

12. The steering column according to claim 11, wherein, on the slip-in end, the slip-in tube has a bendable predeformation zone in a slip-in direction.

\* \* \* \* \*